D. COOK.
MOUSETRAP.
APPLICATION FILED JULY 18, 1917. RENEWED DEC. 13, 1919.
1,337,044.
Patented Apr. 13, 1920.
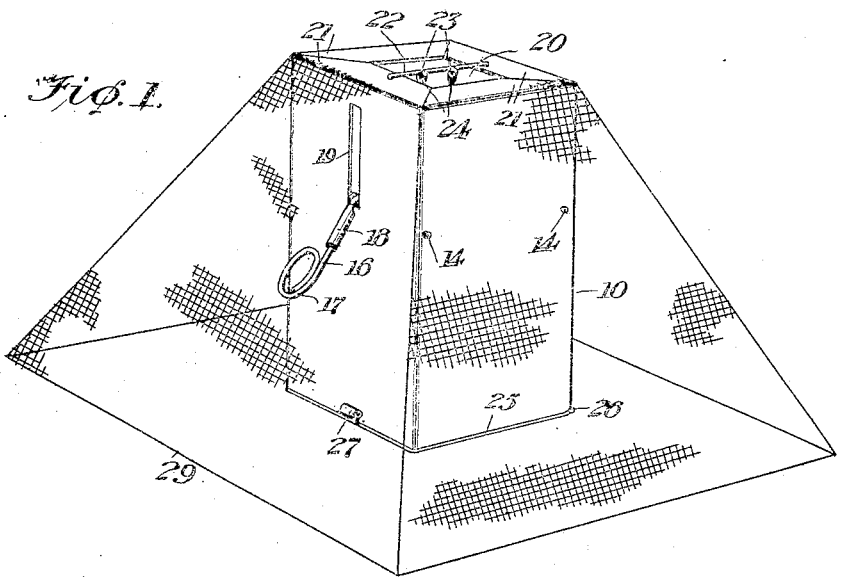
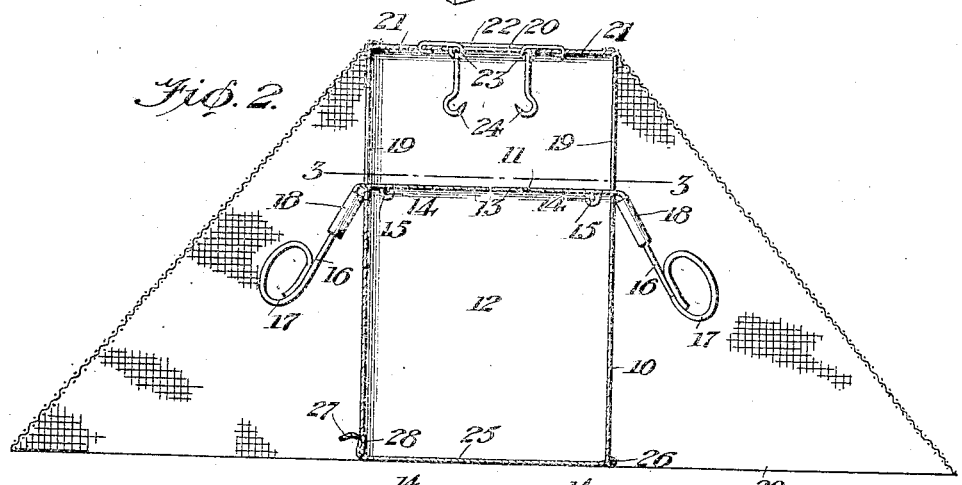
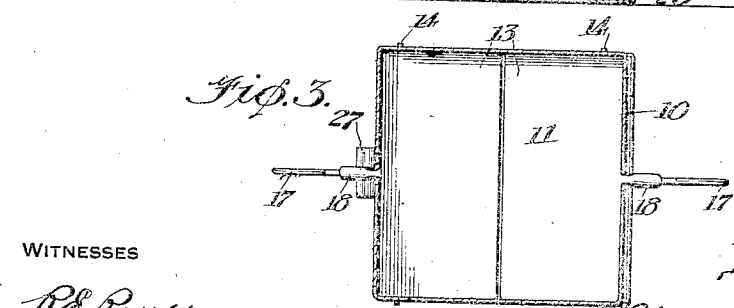
WITNESSES
R. E. Rousseau
INVENTOR
Daniel Cook,
BY Victor J. Evans.
ATTORNEY

UNITED STATES PATENT OFFICE.

DANIEL COOK, OF LYMAN, UTAH.

MOUSETRAP.

1,337,044. Specification of Letters Patent. Patented Apr. 13, 1920.

Application filed July 18, 1917, Serial No. 181,371. Renewed December 13, 1919. Serial No. 344,709.

*To all whom it may concern:*

Be it known that I, DANIEL COOK, a citizen of the United States, residing at Lyman, in the county of Wayne and State of Utah, have invented new and useful Improvements in Mousetraps, of which the following is a specification.

This invention relates to animal traps and particularly to that class of traps in which the animals are dropped into a closed chamber, from which they may be afterward removed and killed in a quick and humane manner.

The object of the invention is the provision of a trap in which the bait is located in a compartment in sight of the animal but out of reach of the same, with another compartment below the first mentioned one and divided therefrom by means of a tilting platform, upon which the animal is forced to jump in an attempt to reach the bait, the surrounding walls of the first mentioned compartment preventing the escape of the animal, which is dropped by means of the tilting platform into the closed compartment below.

A further object of the invention is to provide a vertically disposed elongated receptacle having inclined walls entirely surrounding the same and preferably formed of foraminous material to hold the receptacle in proper position and provide means for reaching the entrance opening.

With the above and other objects in view, the invention consists of the following novel combination and arrangement of parts, hereinafter more fully described and illustrated in the accompanying drawings, in which—

Figure 1 is a perspective view of an animal trap embodying the present invention.

Fig. 2 is a vertical central sectional view of the same.

Fig. 3 is a horizontal sectional view on the line 3—3 of Fig. 2.

Referring to the drawings in detail, the trap includes a receptacle 10, which is divided into an upper compartment 11 and a lower compartment 12, the division being made by means of partitions 13.

These partitions are pivoted upon transversely arranged rods 14, secured within the side walls of the receptacle, the said rods passing through ears 15 formed upon or carried by each of the platforms 13, the ears being positioned adjacent opposite walls of the platforms so that the said platforms are arranged to permit of the downward tilting of their inner opposed edges.

The platforms 13 are maintained in a substantially horizontal position by means of weights, which consist of wires or rods 16, having one end bent into the form of a loop 17 and having their opposite ends received within the sleeves 18 carried by or formed upon the reduced ends of the platforms 13. The sleeves 18 project through slots or openings 19 formed in the side walls of the upper chamber 11, the said sleeves being adapted to engage the outer faces of the walls of the receptacle to limit the upward movement of the platforms 13 to normally hold them in position for the reception of the animal.

The upper chamber 11 is provided with an entrance opening 20, which is surrounded by a flange 21 formed by the inwardly extending top wall of the chamber 11, so that the animal is obliged to enter the trap through the opening 20 and when once within the chamber 11 its escape is effectually prevented.

Arranged across the entrance 20 of the chamber 11 is a bar 22, in which is formed loops or eyes 23 to provide means for mounting loosely pivoted hooks 24, which are adapted to hold any suitable bait.

The lower chamber 12 is provided with a bottom 25, which is hinged as at 26 and carries at its opposite edge a spring engaging lip 27, which is adapted to engage a depression 28 in the wall of the receptacle for the purpose of holding the bottom 25 in a closed position.

If desired, the trap may be surrounded by an inclined wall 29 of any suitable material, to provide means by which the animal may obtain access to the opening 20. The employement of this inclined wall 29 is optional, as the trap may be set at any desired position adjacent a box or other article to provide means for the animal reaching the entrance opening 20.

The purpose of the hinged bottom 25 is to provide means for removal of the trapped animals so that they may be killed or destroyed in a quick and humane manner.

It is believed that from the foregoing description when taken in connection with the accompanying drawings, the construction, operation and advantages of the invention will be apparent. The right is reserved to make such changes in the form and proportion of the invention as will fall within the scope of the appended claim.

Having described the invention, what is claimed is:

An animal trap embodying an elongated rectangular receptacle provided at its upper end with an inwardly extending horizontally disposed flange to form a centrally arranged restricted entrance opening, a hinged closure for the lower end of the receptacle, a pivoted platform positioned transversely within said receptacle between the entrance opening and the hinged closure, said platform dividing the receptacle into upper and lower chambers, a counterbalanced arm carried by the platform and extending through a slot formed in the side of the receptacle and hooks pivotally mounted within the entrance opening and extending below the flange within the upper chamber and above the pivoted platform.

In testimony whereof I affix my signature.

DANIEL COOK.